United States Patent [19]

Chen

[11] Patent Number: 5,031,817

[45] Date of Patent: Jul. 16, 1991

[54] ELECTRIC SOLDERING IRON

[76] Inventor: Ming Hong Chen, No. 7, Yung Chang Lane, Yung Ho Rd., Ta Ya Hsiang, Taichung Hsien, Taiwan

[21] Appl. No.: 565,810

[22] Filed: Aug. 13, 1990

[51] Int. Cl.5 ............................................. B23K 3/00
[52] U.S. Cl. ....................................... 228/20; 228/52; 228/55
[58] Field of Search .................... 228/20 AT, 264, 52, 228/55

[56] References Cited

FOREIGN PATENT DOCUMENTS 2404698 8/1975 Fed. Rep. of Germany ........ 228/20 HT
157774 12/1982 German Democratic Rep. ... 228/20 HT
61-159268 7/1986 Japan .............................. 228/20 HT

*Primary Examiner*—Sam Heinrich
*Attorney, Agent, or Firm*—Rogers, Howell & Haferkamp

[57] ABSTRACT

An electric soldering iron includes a barrel and a head portion with a center hole being pivoted to a front end of the barrel. A piston and a piston rod are disposed in the front end of the barrel. A spring embraces the piston rod and bears against the piston. A solenoid is disposed in a rear end of the barrel. A button is disposed at a rear end of the barrel for controlling the solenoid. The piston is pushed forward by the spring when the solenoid is not actuated. A depression of the button actuates the solenoid to draw the piston rearward.

6 Claims, 5 Drawing Sheets

ELECTRIC SOLDERING IRON

BACKGROUND OF THE INVENTION

The present invention relates to a soldering iron, and more particularly to an electric soldering iron.

An electric soldering iron which is widely used nowadays comprises a handle and a head portion. The tip of the head portion is solid and is heated for soldering purposes. A manual vacuum pump, which is generally a cylinder with a piston slidable therein, is used to suck or to remove a melted solder on a circuit board. When operating, both hands are required to hold the electric soldering iron and the manual vacuum pump respectively. The vacuum pump is used after the solder is melted by the electric soldering iron and after the electric soldering iron has been removed. Normally, the vacuum pump sucks only part of the melted solder. Usually, it takes several times to melt and to suck to solder for removing the solder from a circuit board.

The present invention has arisen to mitigate and/or obviate the afore-described disadvantages of the conventional electric soldering iron.

SUMMARY OF THE INVENTION

The primary objective of the present invention is to provide an electric soldering iron which can be operated to melt and suck a solder by only one hand.

In accordance with one aspect of the present invention, there is provided an electric soldering iron which includes a barrel and a head portion with a center hole being pivoted at a front end of the barrel. A cylinder with a piston and a piston rod is disposed in the front end of the barrel. A spring is disposed around the piston rod and bears against the piston. A solenoid is disposed in a rear end of the barrel. A press button is disposed at a front end of the barrel for controlling the solenoid. The piston is pushed forward by the spring when the solenoid is not actuated. A depression of the press button actuates the solenoid to draw the piston rearward.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
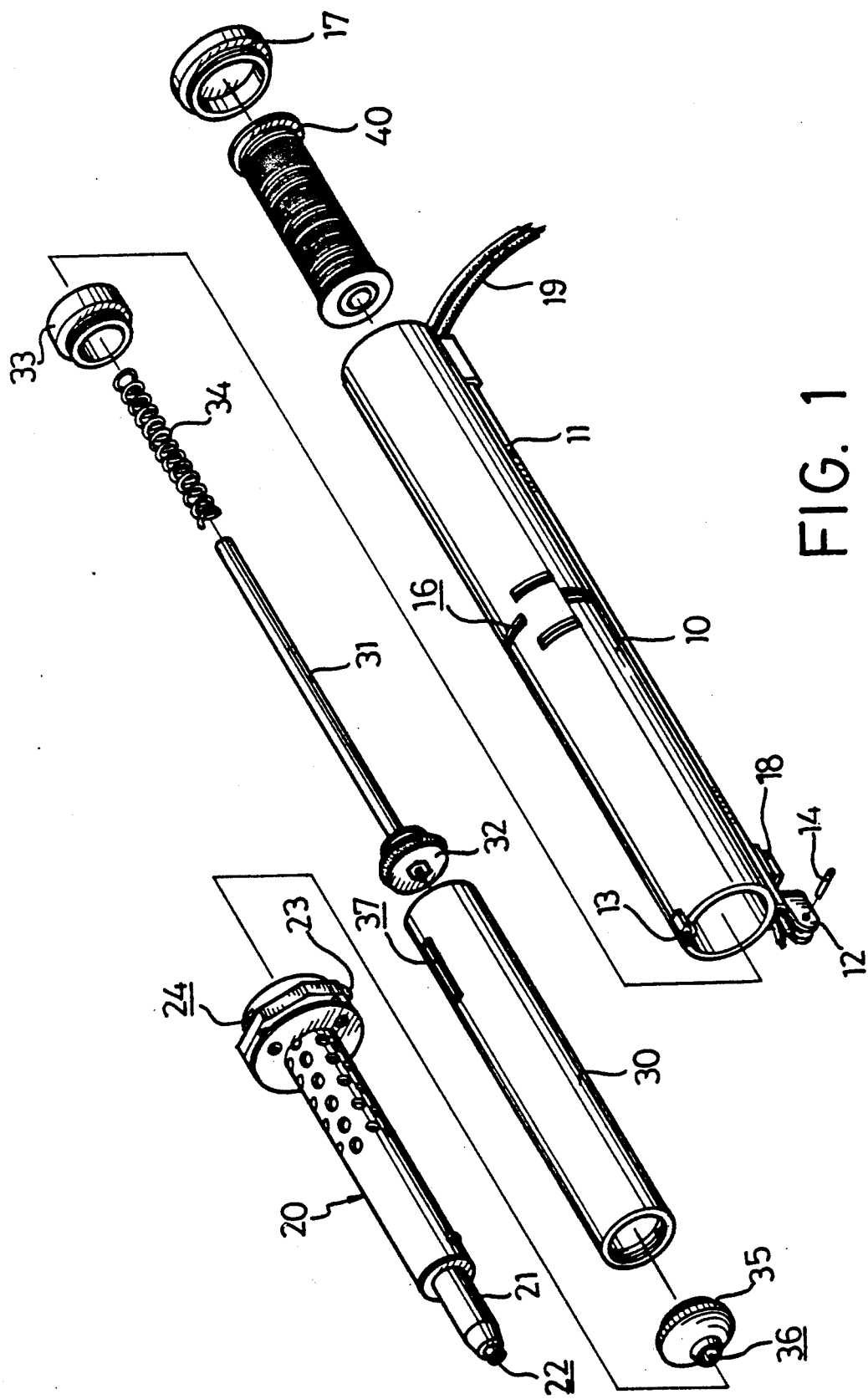
FIG. 1 is an exploded view of an electric soldering iron in accordance with the present invention.
Figure 2:
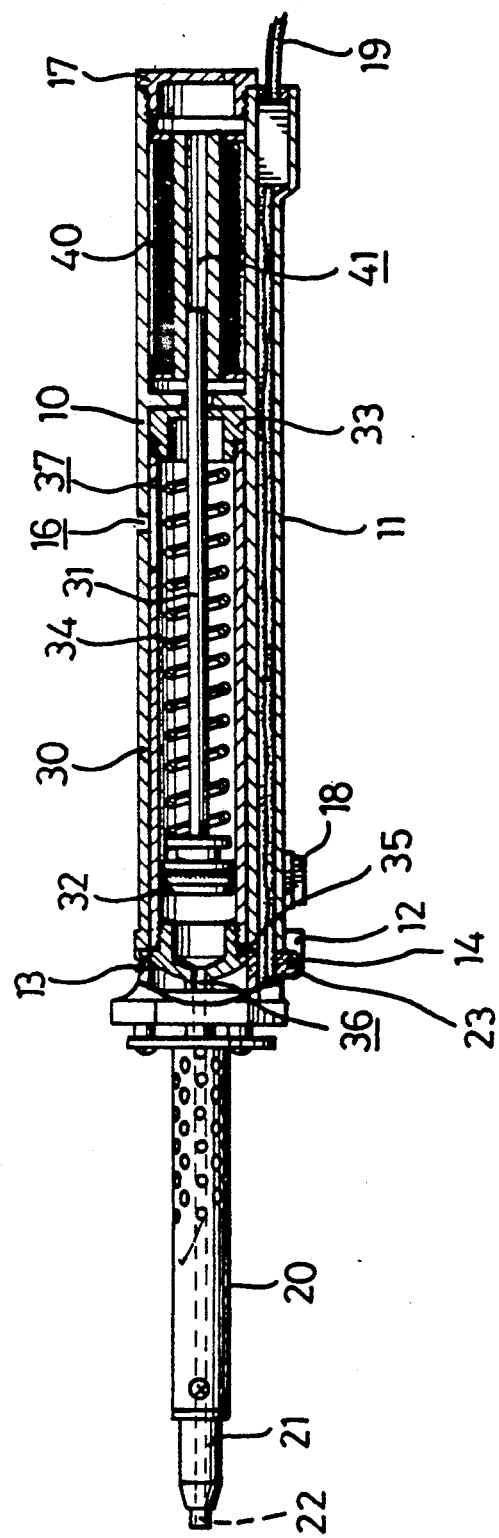
FIG. 2 is a longitudinally cross sectional view of the electric soldering iron.

Referring to the drawings and initially to FIGS. 1 and 2, an electric soldering iron in accordance with the present invention comprises generally a barrel 10, a head portion 20 being pivotally connected on a front end of the barrel 10, a cylinder 30 with a piston rod 31 and a piston 32 being disposed in the barrel 10 and a solenoid 40 being disposed in a rear end of the barrel 10.

Figure 3:
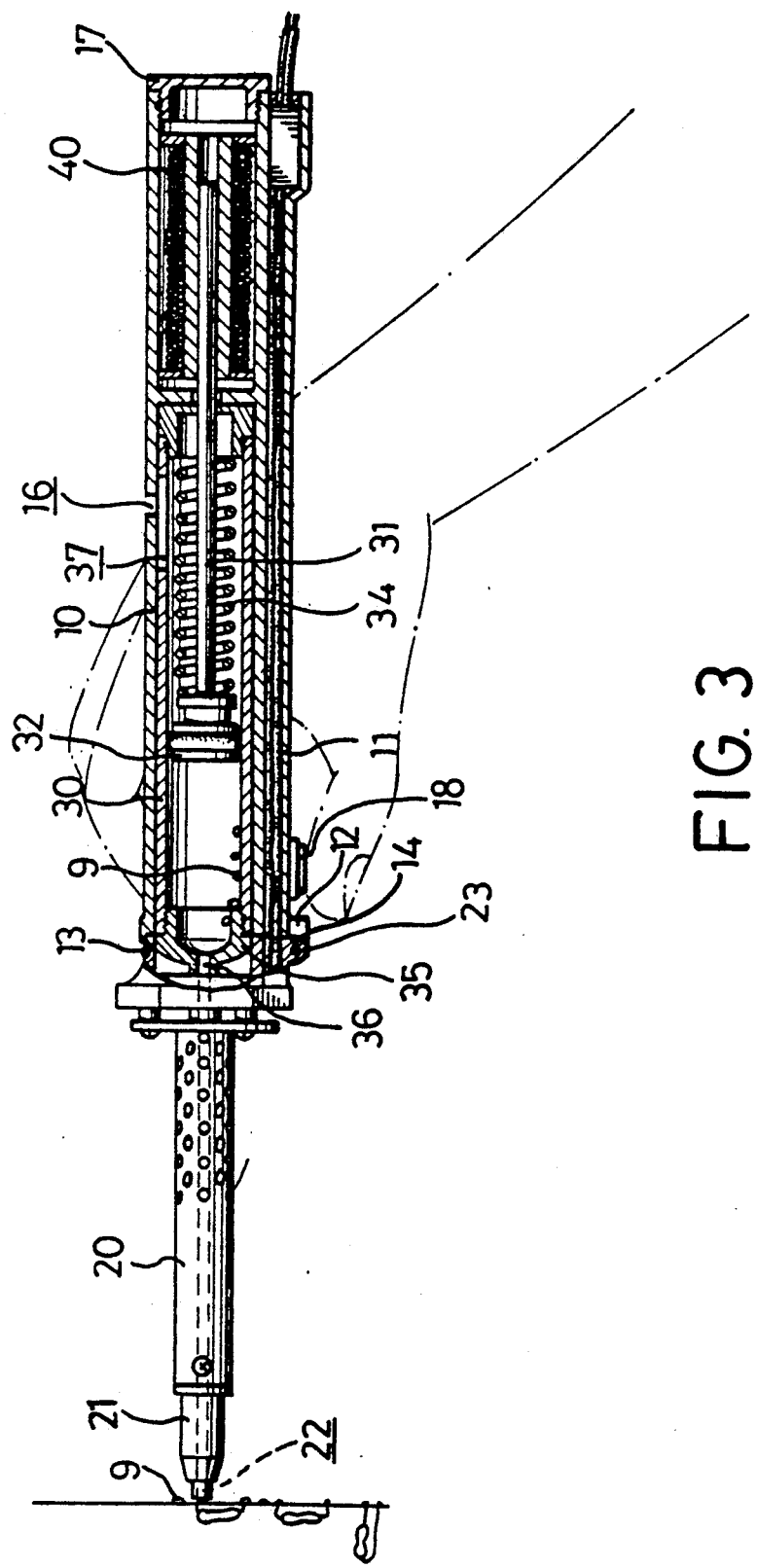
FIG. 3 is a cross sectional view similar to FIG. 2, illustrating a working position thereof.

A channel 11 is longitudinally provided on a bottom of the barrel 10 for receiving an electric wire 19. A female lug 12 is provided on a front end of the barrel 10 at a bottom end thereof. A retaining clamp 13 is provided on the upper front end of the barrel 10 opposite to the female lug 12. A plurality of oblong holes 16 are laterally formed on a rear portion of the barrel 10. An end cover 17 is provided for enclosing the rear end of the barrel 10. A switch or a press button 18 is fixed to the front end of the channel 11 for controlling an electric circuit of the solenoid 40 which is disposed in the rear end of the barrel 10. As shown in FIG. 3, the press button 18 can be easily depressed by a hand of a user when the hand holds the barrel 10 for soldering operation.

A lug 23 is provided on a rear end of the head portion 20 at a bottom end thereof. The lug 23 is pivotally connected to the female lug 12 of the barrel 10 by a pivot pin 14 so that the head portion 20 is rotatable about the pivot pin 14. A recess 24 is formed on the rear end of the head portion 20, at a top end thereof, opposite to the lug 23. The recess 24 receives the retaining clamp 13 of the barrel 10 when the head portion 20 rotates to a position in line with the barrel 10. A tip 21 is provided at a front end of the head portion 20. A center hole 22 runs all the way through the head portion 20.

A front cap 35 with a through hole 36 is threadedly connected to a front end of the cylinder 30. The through hole 36 of the front cap 35 is communicated with the center hole 22 of the head portion 20. An oblong hole 37 is longitudinally formed on the cylinder 30. The cylinder 30 is positioned such that the oblong hole 37 is communicated with at least one of the oblong holes 16 of the barrel 10. The piston 32 is slidable in the cylinder 30. A rear cap 33 is threadedly connected on the rear end of the cylinder 30. A spring 34 embraces the piston rod 31 and bears between the piston 32 and the rear cap 33. The rear end of the piston rod 31 extends through the rear cap 33 and is slidable in a center bore 41 of the solenoid 40. The spring 34 pushes the piston 32 forward to the position as shown in FIG. 2 when the solenoid 40 is not actuated. The cylinder 30 and the solenoid 40 are stably retained within the barrel 10 by the head portion 20 and the end cover 17.

Referring next to FIG. 3, when the press button 18 is depressed by a user, the solenoid 40 is actuated to draw the piston rod 31 rearward, the piston rod 31 is drawn in a fast speed so that a suction force is generated to suck the melted solder 9 into the cylinder 30 through the center hole 22 of the head portion 20 and the through hole 36 of the front cap 35. The air in the cylinder 30 behind the piston 32 flows out through the oblong hole 37 of the cylinder 30 and the oblong holes 16 of the barrel 10 such that no pressurized air will be built within the cylinder 30 and such that the piston 32 can be easily retracted. When the user releases the press button 18, the spring 34 pushes the piston 32 forward to the position as shown in FIG. 2. The melted solder 9 can be easily sucked by a reciprocating movement of the piston 32 which is actuated by the solenoid 40 by an intermittent depression of the press button 18.

Figure 4:
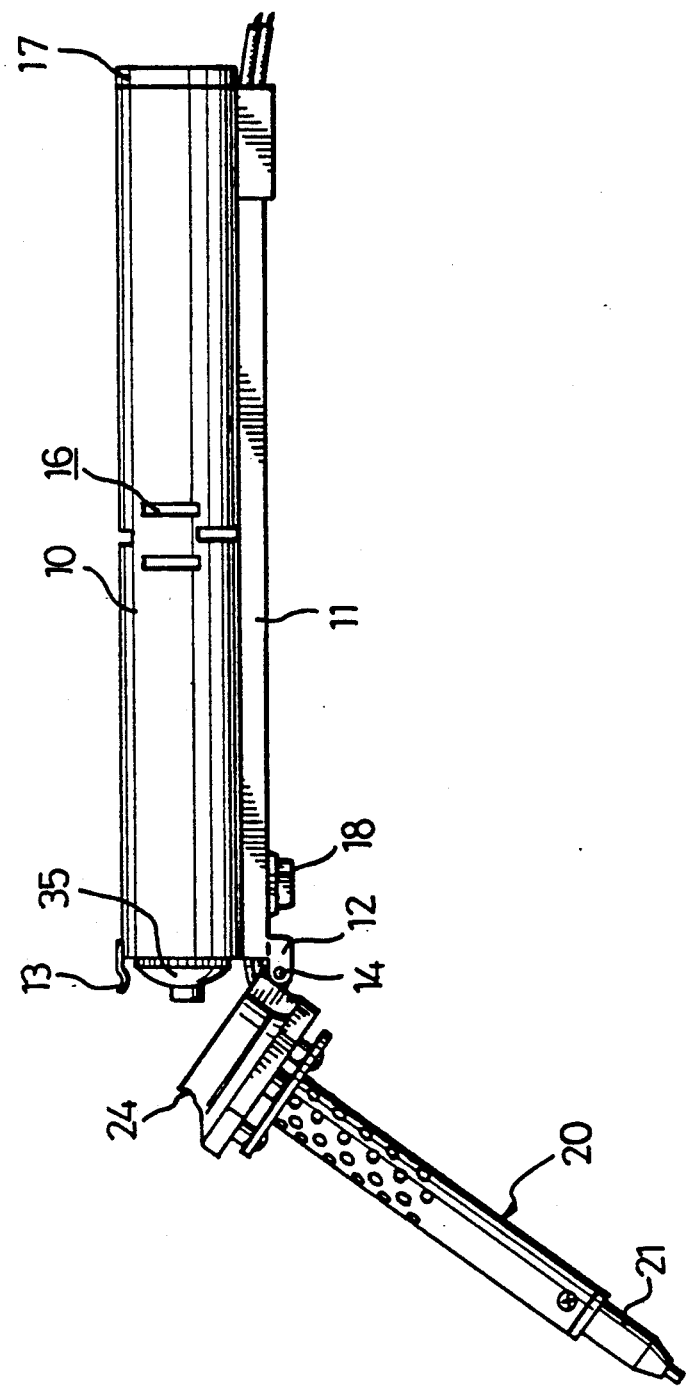
FIG. 4 is a plan view illustrating a pivotal movement between a handle and a head portion of the electric soldering iron.

After use, referring next to FIG. 4, the head portion 20 is pushed to rotate about the pivot pin 14 so that the front cap 35 of the cylinder 30 is exposed and is reachable. The cylinder 30 can be removed from the barrel 10 and the front cap 35 can be disconnected from the cylinder 30 so that the solder 9 collected in the cylinder 30 can be removed from the cylinder 30.

Alternatively, without the cylinder 30, the piston 32 and the piston rod 31 are directly provided in the barrel 10. The spring 34 bears between the piston 32 and the solenoid 40 so that the piston 32 and the piston rod 31 are pushed forward by the spring 34 when the solenoid 40 is not actuated. The piston 32 is draw rearward when the solenoid is actuated.

Figure 5:
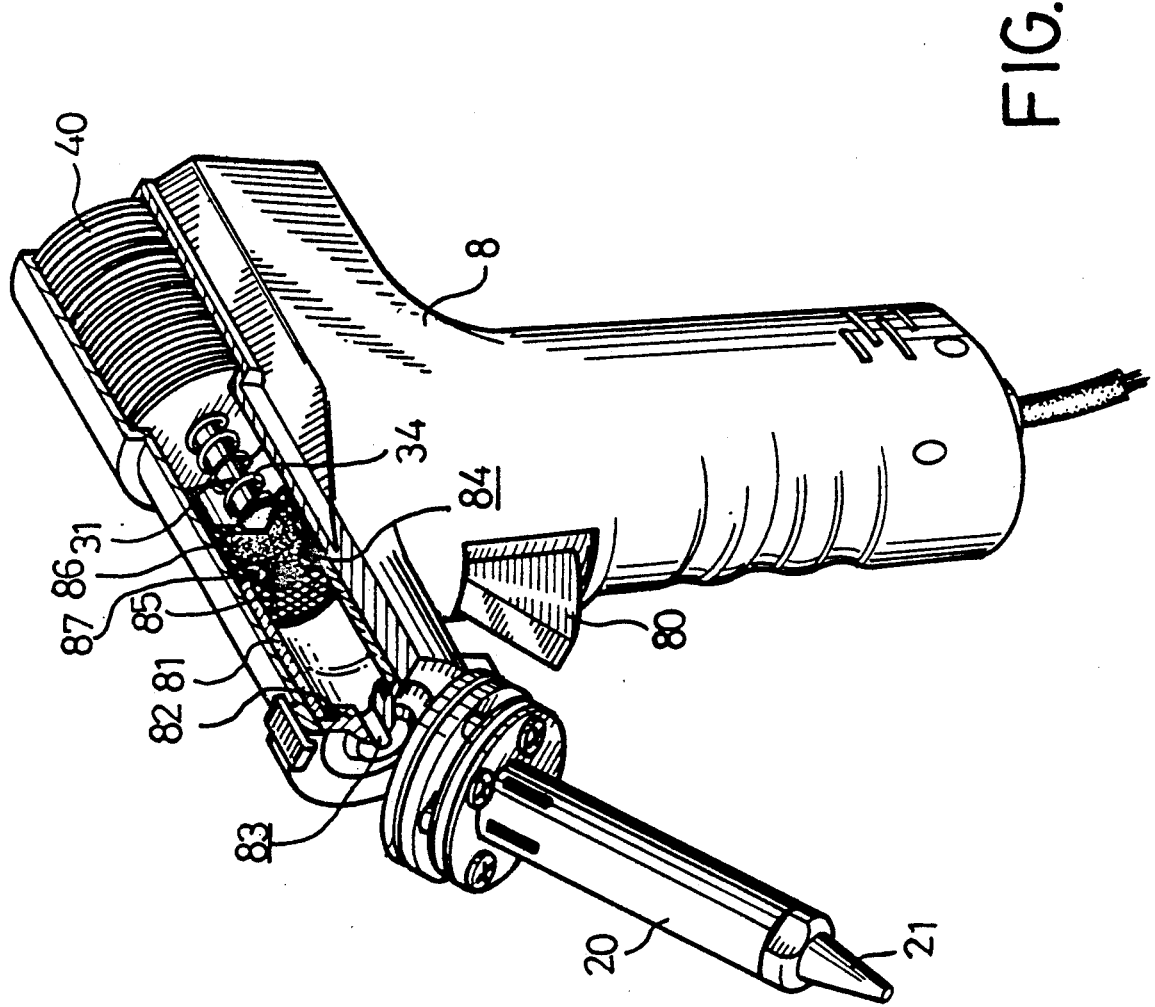
FIG. 5 is a perspective view of another embodiment of the present invention 1..

Referring next to FIG. 5, illustrated is another embodiment of the invention. In this embodiment, the solenoid 40 is disposed in a rear and upper end of a gun body 8. A trigger 80 is provided for controlling the electric circuit of the solenoid 40 instead of the press button 18 so that the electric soldering iron can be operated easily. The rear end of the piston rod 31 is also slidably disposed in the center of the solenoid 40. A cylindrical tube 81 is disposed in front of the solenoid 40. A cap 82 with an aperture 83 is force-fitted onto the front end of the tube 81. An annular groove 84 is formed in the rear end of the tube 81. A web 85 is force-fitted in the tube 81 and is engaged with the annular groove 84 which limits a movement of the web 85. A resilient sleeve 86, or a bellows type member, has an annular flange 87 formed in an inner and front end of the sleeve 86 for engaging with the annular groove 84 of the tube 81. The front end of the piston rod 31 is fixed to a rear end of the sleeve 86.

In rest position, the sleeve 86 is compressed by the spring 34. When the trigger 80 is depressed by a user, the solenoid 40 is actuated to draw the piston rod 31 rearward. Simultaneously, the rear end of the sleeve 86 is drawn by the piston rod 31 so that a suction force is generated to suck the melted solder 9 into the tube 81 through the head portion 20 and the aperture 83 of the cap 82. When the user releases the trigger 80, the spring 34 pushes the sleeve 86 forward to the rest position. The melted solder 9 can be easily sucked by a reciprocating movement of the rear end of the sleeve 86 which is actuated by the solenoid 40 by an intermittent depression of the trigger 80.

Accordingly, the solder on a circuit board can be melted and removed from a circuit board by the electric soldering iron in accordance with the present invention. The electric soldering iron can be operated by only one hand.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric soldering iron comprising a barrel; a head portion being pivoted to a front end of said barrel, a center hole being longitudinally formed in said head portion; a cylinder being disposed in said front end of said barrel, a front cap with a through hole being removably attached to a front end of said cylinder, said through hole being communicated with said center hole of said head portion; a piston and a piston rod being slidable in said cylinder; a spring embracing said piston rod and bearing against a rear end of said piston; a solenoid with a center bore being disposed in a rear end of said barrel; a rear end of said piston rod extending beyond said cylinder and being slidable in said center bore of said solenoid; a button being disposed on said barrel for controlling said solenoid; said piston being pushed forward by said spring when said solenoid is not actuated; and a depression of said button actuating said solenoid to draw said piston rearward so that a suction force is generated to suck a melted solder.

2. An electric soldering iron according to claim 1, wherein said head portion is pivoted to said front end of said barrel so that said head portion is foldable relative to said barrel; and a retaining clamp is provided on said front end of said barrel for fixing said head portion in position when said head portion is pivoted to align with said barrel.

3. An electric soldering iron according to claim 2, wherein a recess is formed on a rear end of said head portion for receiving said retaining clamp of said barrel when said head portion is aligned with said barrel.

4. An electric soldering iron according to claim 1, wherein a plurality of laterally extending oblong holes are formed on a rear portion of said barrel; a longitudinally extending oblong hole is formed on said cylinder, said cylinder is positioned such that said longitudinally extending oblong hole is communicated with at least one of said radially extending oblong holes of said barrel.

5. An electric soldering iron comprising a barrel; a head portion being pivoted to a front end of said barrel, a center hole being longitudinally formed in said head portion; a piston and a piston rod being provided and slidable in said barrel; a spring embracing said piston rod and bearing against a rear end of said piston; a solenoid with a center bore being disposed in a rear end of said barrel; a rear end of said piston rod being slidable in said center bore of said solenoid; a button being disposed on said barrel for controlling said solenoid; said spring bearing between said piston and said solenoid; said piston being pushed forward by said spring when said solenoid is not actuated; and a depression of said button actuating said solenoid to draw said piston rearward so that a suction force is generated to suck a melted solder.

6. An electric soldering iron comprising a gun body having a trigger; a head portion being pivoted to a front end of said gun body, a center hole being longitudinally formed in said head portion; a tube being disposed in an upper and front end of said gun body, a cap with an aperture being removably attached to a front end of said tube, said aperture being communicated with said center hole of said head portion; a solenoid with a center bore being disposed in an upper and rear end of said gun body; said trigger being provided for controlling said solenoid; a rear end of a piston rod being slidable in said center bore of said solenoid; a front end of a sleeve being coupled to a rear end of said tube and a rear end of said sleeve being coupled to a front end of said piston rod; a spring embracing said piston rod and bearing against said rear end of said sleeve; said piston being pushed forward by said spring when said solenoid is not actuated; and a depression of said trigger actuating said solenoid to draw said piston rearward so that a suction force is generated to suck a melted solder.

* * * * *